United States Patent
Heinrich

(10) Patent No.: US 12,502,998 B2
(45) Date of Patent: Dec. 23, 2025

(54) METHOD FOR ELECTRICALLY CHARGING VEHICLE BATTERIES FOR A GROUP OF VEHICLES

(71) Applicant: Vitesco Technologies GmbH, Regensburg (DE)

(72) Inventor: Andreas Heinrich, Munich (DE)

(73) Assignee: VITESCO TECHNOLOGIES GMBH, Regensburg (DE)

(*) Notice: Subject to any disclaimer, the term of this patent is extended or adjusted under 35 U.S.C. 154(b) by 891 days.

(21) Appl. No.: 17/769,055

(22) PCT Filed: Oct. 14, 2020

(86) PCT No.: PCT/EP2020/078852
§ 371 (c)(1),
(2) Date: Apr. 14, 2022

(87) PCT Pub. No.: WO2021/074195
PCT Pub. Date: Apr. 22, 2021

(65) Prior Publication Data
US 2024/0100983 A1    Mar. 28, 2024

(30) Foreign Application Priority Data
Oct. 15, 2019  (DE) .................. 10 2019 215 839.0

(51) Int. Cl.
*B60L 53/64* (2019.01)
*B60L 53/63* (2019.01)
*B60L 53/67* (2019.01)

(52) U.S. Cl.
CPC .............. *B60L 53/64* (2019.02); *B60L 53/63* (2019.02); *B60L 53/67* (2019.02);
(Continued)

(58) Field of Classification Search
CPC ........................................ B60L 53/64
(Continued)

(56) References Cited

U.S. PATENT DOCUMENTS

| 10,861,112 B2* | 12/2020 | Forbes, Jr. ......... G06Q 30/0283 |
| 2011/0015799 A1* | 1/2011 | Pollack .................. B60L 53/67 700/297 |

(Continued)

FOREIGN PATENT DOCUMENTS

| CN | 103457326 A | 12/2013 | ................ H02J 7/00 |
| CN | 104755313 A | 7/2015 | .............. B60L 11/18 |

(Continued)

OTHER PUBLICATIONS

Chinese Office Action, Application No. 202080072415.3, 11 pages, Dec. 7, 2023.
(Continued)

*Primary Examiner* — Jerry D Robbins
(74) *Attorney, Agent, or Firm* — Slayden Grubert Beard PLLC

(57) ABSTRACT

Various embodiments of the teachings herein include a method for electrically charging vehicle batteries for a group of member vehicles. The method may include: predicting a total energy requirement for charging batteries for the group in a future time period; predicting a temporal distribution of the charging power requirement for the group over the future time period; calculating a total charging power profile optimized in respect of one or more optimization criteria according to the predicted total energy requirement and the predicted temporal distribution of the charging power requirement; purchasing an amount of energy in accordance with the optimized total charging power profile on a relevant energy market; and chronometrically controlling the charging processes of each member vehicle with a respective (Continued)

charging profile so the sum of the respective charging profiles of the individual member vehicles corresponds to the optimized total profile of the charging power.

9 Claims, 4 Drawing Sheets

(52) U.S. Cl.
 CPC ....... *B60L 2240/72* (2013.01); *B60L 2260/42* (2013.01); *B60L 2260/54* (2013.01)

(58) Field of Classification Search
 USPC .......................................................... 320/109
 See application file for complete search history.

(56) References Cited

U.S. PATENT DOCUMENTS

| 2015/0159574 | A1 | 6/2015 | Stack et al. | 701/104 |
| 2015/0236531 | A1 | 8/2015 | Guillou et al. | 320/101 |
| 2021/0086647 | A1* | 3/2021 | Kiessling | B60L 53/67 |
| 2021/0221247 | A1* | 7/2021 | Daniel | B60L 55/00 |

FOREIGN PATENT DOCUMENTS

| CN | 109228949 A | 1/2019 | B60L 53/60 |
| DE | 102013002078 A1 | 8/2013 | B60L 11/18 |
| DE | 10 2015 224 075 | 6/2017 | G07C 5/08 |
| DE | 102015226479 A1 | 6/2017 | B60L 50/15 |
| EP | 2 928 721 | 10/2015 | B60L 3/12 |
| JP | 2019033629 A | 2/2019 | B60L 50/40 |
| WO | 2014/087092 A1 | 6/2014 | B60L 11/18 |
| WO | 2018 156732 | 8/2018 | B60L 11/00 |

OTHER PUBLICATIONS

Search Report for International Application No. PCT/EP2020/078852, 14 pages, Feb. 17, 2021.

* cited by examiner

METHOD FOR ELECTRICALLY CHARGING VEHICLE BATTERIES FOR A GROUP OF VEHICLES

CROSS-REFERENCE TO RELATED APPLICATIONS

This application is a U.S. National Stage Application of International Application No. PCT/EP2020/078852 filed Oct. 14, 2020, which designates the United States of America, and claims priority to DE Application No. 10 2019 215 839.0 filed Oct. 15, 2019, the contents of which are hereby incorporated by reference in their entirety.

TECHNICAL FIELD

The present disclosure relates to batteries. Various embodiments of the teachings herein may include methods and/or systems for charging vehicle batteries for a group of vehicles as well as central control devices for charging vehicle batteries for a group of vehicles.

BACKGROUND

As the electrification of the propulsion of vehicles increases, solutions that enable smart charging of a large number of vehicles that is as ecological or economical as possible are in demand. On the one hand, the availability of energy from renewable energy sources such as solar energy and wind energy is heavily dependent on the weather and the time of day. On the other hand, as a result, the prices for energy are subject to strong daily and longer-term fluctuations, amongst other things. These prices are obtained on regional or national electricity markets or electricity exchanges and apply in the respective region or the respective country.

More and more electrical power becomes necessary for charging electrically operated vehicles with an electrical traction machine that is fed from a vehicle battery, such as pure electric vehicles or what are known as plug-in hybrids. It can therefore be beneficial for a user of an electric vehicle or a plug-in hybrid to charge the vehicle battery as much as possible when the electricity is particularly cheap and/or when as much energy from renewable energy sources as possible is available. It is not possible to trade on the electricity exchange as an individual vehicle user, however. This is only possible for authorized dealers, grid operators, electricity suppliers, or large purchasers such as large companies.

SUMMARY

The present disclosure includes methods and systems for allowing cheap and possibly ecological charging of the electric vehicle for drivers of electric vehicles. For example, some embodiments include a method for electrically charging vehicle batteries for a group (10) of member vehicles (1, 2, . . . N) including: predicting a total energy requirement for electrically charging vehicle batteries for the group (10) of member vehicles (1, 2, . . . N) in a future time period, predicting a temporal distribution (21) of the charging power requirement for the group (10) of member vehicles (1, 2, . . . N) over the future time period, calculating a total charging power profile (POPT), which is optimized in respect of one or more optimization criteria, for the group of member vehicles (1, 2, . . . N) according to the predicted total energy requirement and the predicted temporal distribution of the charging power requirement (21), purchasing an amount of energy in accordance with the optimized total charging power profile (POPT) on a relevant energy market (26), and chronometrically controlling the charging processes of the individual member vehicles (1, 2, . . . N) from the group with a respective charging profile in such a way that the sum of the respective charging profiles (Pi) of the individual member vehicles (1, 2, . . . N) corresponds to the optimized total profile of the charging power.

In some embodiments, the method includes predicting a price trend (22) to be expected for electrical power on a relevant energy market in the future time period.

In some embodiments, the price trend to be expected for electrical power on a relevant energy market in the future time period is predicted according to weather data (23).

In some embodiments, the optimized total charging power profile (POPT) for the group (10) of member vehicles (1, 2, . . . N) is additionally calculated according to weather data (23) and/or according to the predicted price trend (22) on the relevant energy market.

In some embodiments, the total energy requirement for electrical charging and/or the temporal distribution of the charging power requirement (21) for the group of member vehicles over the future time period are/is predicted on the basis of a statistical evaluation of information about past charging processes of the member vehicles.

In some embodiments, the member vehicles transmit information about charging processes and/or other vehicle data and/or user data to a central computing unit via a wireless communication interface.

In some embodiments, user data of drivers of the group are evaluated for predicting the total energy requirement and predicting the temporal distribution of the charging power requirement for the group of member vehicles (1, 2, . . . N) over the future time period.

In some embodiments, the chronometric control of the charging processes of the individual member vehicles (1, 2, . . . N) with respective power profiles is adapted when required.

In some embodiments, the steps of predicting the total energy requirement, predicting the temporal distribution of the charging power requirement over the future time period, calculating the optimized total charging power profile (POPT) and purchasing an amount of energy are performed repeatedly at decreasing intervals of time from the future time period, and, during the purchasing, initially only a portion of the amount of energy in accordance with the optimized total charging power profile (POPT) is purchased, and, during the repeated performance, some or all of the difference between the optimized total charging power profile and the amount of energy already purchased for the future time period is additionally purchased.

As another example, some embodiments include a central control unit for electrically charging vehicle batteries for a group of member vehicles (1, 2, . . . N), having a reception device for receiving vehicle data and/or user data of member vehicles (1, 2, . . . N) belonging to the group, a prediction unit for predicting a total energy requirement of the group of member vehicles in a future time period, a prediction unit for predicting a temporal distribution of the charging power requirement of the member vehicles (1, 2, . . . N) over the future time period, a computing unit for calculating a total charging power profile (POPT), which is optimized in respect of one or more optimization criteria, for the group of member vehicles according to the predicted total energy requirement and the predicted temporal distribution (21) of the charging power requirement, and a control unit for chronometrically controlling the charging processes of the individual member vehicles from the group with a respective charging profile in such a way that the sum of the respective charging profiles (Pi) of the individual member vehicles (1, 2, . . . N) corresponds to the optimized total profile (POPT) of the charging power.

As another example, some embodiments include a vehicle storage/computing unit that is designed to store information about past charging processes and/or other vehicle data and/or user data and to transmit said information and/or data to the central control unit as described herein via a communication interface.

In some embodiments, the unit is designed to evaluate the stored data and/or to predict a future energy requirement and/or the time characteristic thereof.

BRIEF DESCRIPTION OF THE DRAWINGS

The teachings herein are explained in more detail below with reference to FIGS. 1 to 4. In the figures, in each case schematically.

DETAILED DESCRIPTION

Figure 1:
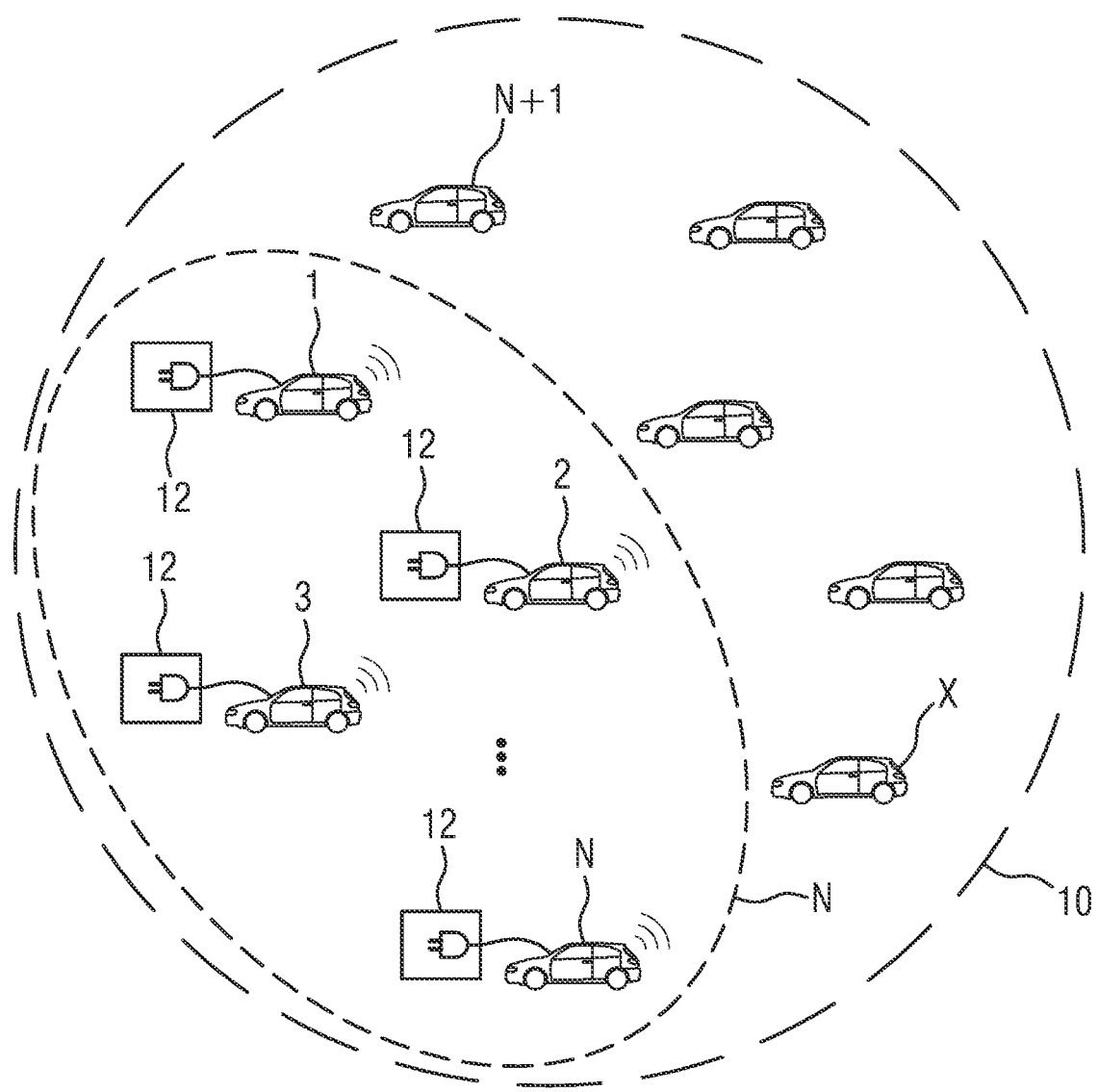
FIG. 1: shows a group consisting of N member vehicles.

The present disclosure describes systems and/or methods that make use of the insight that purchasers of large amounts of energy can trade on the electricity exchange. An example method incorporating the teachings herein for electrically charging vehicle batteries for a group of member vehicles has the steps of:

predicting a total energy requirement for electrically charging vehicle batteries for the group of member vehicles in a future time period, predicting a temporal distribution of the charging power requirement for the group of member vehicles over the future time period, calculating a total charging power profile, which is optimized in respect of one or more optimization criteria, for the group of member vehicles according to the predicted total energy requirement and the predicted temporal distribution of the charging power requirement, purchasing an amount of energy in accordance with the optimized total charging power profile on a relevant energy market, and chronometrically controlling the charging processes of the individual member vehicles from the group with a respective charging profile in such a way that the sum of the respective charging profiles of the individual member vehicles corresponds to the optimized total profile of the charging power.

The methods described herein may be suitable for charging electrically operable vehicles, that is to say vehicles that have at least one electrical traction machine that is powered by a vehicle battery. The vehicles may be networked vehicles. In some embodiments, a group consists of a number X of member vehicles with a vehicle battery that is intended at least to operate an electrical traction machine of the vehicle. The number X of vehicles in the group and the collective energy requirement thereof is preferably large enough to be able to enter the energy market as a group. The number X is therefore dependent on regulations of the respective energy market, for example of a country.

By way of example, a number X of at least 50, 100 or 1000 vehicles in a group is conceivable. The number X may not be predefined, but rather aligned with the number of vehicles/drivers participating in the method. The number X is furthermore not constant or limited, but rather grows with the number of users. A user can register a vehicle with the group, for example, and the vehicle therefore becomes a member vehicle in the group. All of the vehicles registered in the group are preferably referred to as member vehicles in this application.

In some embodiments, the designation member vehicles here can also refer only to the proportion of the registered vehicles that are connected to a charging socket, and are therefore "ready to be charged", at the time of the method being carried out. In certain energy markets, regional marketing of energy in the form of micromarkets may also be possible. By way of example, electricity can be procured directly from a neighbor that operates a photovoltaic installation. In the case of such micromarkets, which are generally operated only at low-voltage level, a group can also consist of only a few vehicles, in the extreme case a single "plugged-in" vehicle, that is to say a vehicle that is ready to be charged. In general, according to the invention, a group can also be referred to as a "cluster".

A statistical total energy requirement of all the member vehicles of the group in a future time period can be predicted from gathered information about past charging processes, present states of charge of the vehicle batteries of the member vehicles, user profiles, such as for example driving habits, charging habits, in particular the time characteristic thereof, etc. By way of example, the future time period lasts 12 or 24 hours or a week and can begin immediately, or can even start in the future, for example with a delay of 12, 24 or 48 hours or a week.

In addition, a statistical temporal distribution of the charging power requirement in the future time period is predicted from the user and vehicle data mentioned. That is to say that this involves statistically determining how many vehicles need what charging power by when. In some embodiments, this may be accomplished by taking into consideration vehicle and user information that allows conclusions to be drawn about when the vehicles are needed again and what state of charge is needed. By way of example, experience has shown that fast charging is required for some member vehicles, whereas for others it is possible to wait for a cheaper time window.

On the basis of the predicted total energy requirement and the predicted temporal distribution of the charging power requirement, an optimized total charging power profile for the group of member vehicles is determined, which is optimized in respect of one or more optimization criteria. Possible optimization criteria are, for example, a lowest possible price for the total amount of energy. A further possible optimization criterion is a highest possible proportion of electricity from renewable energy sources. A further possible optimization criterion is a shortest possible charging time, this criterion sometimes possibly conflicting with the other optimization criteria.

On the basis of the optimized total charging power profile thus determined, electrical power is now purchased on a relevant electricity market, that is to say on the electricity exchange, for example. The electricity producers are therefore contractually obliged to supply the requested power to the electricity grid in accordance with the time profile and at the respectively applicable electricity prices.

In some embodiments, individual charging profiles may be determined for the individual member vehicles, and the charging processes of the individual member vehicles are controlled appropriately in accordance with the respective profile. Said control of the charging processes of the member vehicles takes place by way of known charging devices, what are known as "on-board chargers", installed in the vehicles. The sum of the individual charging profiles for the member vehicles here corresponds to the optimized total charging power profile and therefore to the amount of energy purchased on the electricity market.

In some embodiments, a price trend to be expected for electrical power on a relevant energy market in the future time period is predicted as an additional step. This predicted price trend is preferably taken into consideration when determining the optimized total charging power profile. By way of example, charging times with a low energy price can therefore be favored and the total price for the amount of energy procured from the electricity market therefore reduced.

For predicting the electricity price trend, it is possible to draw on known prediction methods that are already used on the electricity market now. The price trend to be expected for electrical power on a relevant energy market in the future time period may also be predicted according to weather data, however.

By way of example, appropriate weather data are a weather forecast. A prediction about the availability of wind or solar energy in the future time period can be derived from the weather forecast. The availability of renewable energy sources such as solar or wind energy can in turn influence the price trend on the energy market. The price trend on the energy market can therefore preferably be predicted by taking weather data or a weather forecast into consideration.

Weather data may also be of direct interest for calculating the optimized total charging power profile, specifically if an optimization criterion is for a highest possible proportion of renewable energy sources to be used. The optimized total charging power profile is therefore preferably determined according to weather data and/or according to the predicted price trend on the relevant energy market.

It is additionally possible to also use weather data for predicting the total energy requirement or predicting the temporal distribution of the charging power requirement. By way of example, high temperatures and a high degree of insolation can necessitate a high air-conditioning requirement in the member vehicles, as a result of which the energy requirement increases.

In some embodiments, the total energy requirement for electrical charging and/or the temporal distribution of the charging power requirement for the group of member vehicles over the future time period are/is predicted on the basis of a statistical evaluation of information about past charging processes of the member vehicles. For this purpose, information about past charging processes and/or other vehicle data and/or user data can preferably be transmitted from the member vehicles to a central computing unit via a wireless communication interface.

By way of example, vehicle data include information about the state of charge (SOC) of the vehicle battery, information about past charging processes, user profiles, information obtained, for example, on the basis of past journeys (driving habits, repeated or regular journeys, schedules, personal charging behavior of the user). Data are preferably transferred anonymously, without personal data. Limited vehicle identification may be facilitated, however, since the individual vehicles are intended to be controlled individually later. Information about past charging processes of the vehicles included in the group may be statistically evaluated in the central computing unit.

By way of example, information about past charging processes can be recorded over periods of use of the electrical charging devices on the vehicles (on-board chargers) and transferred to the central server unit. By way of example, a central computing unit can be a server device or can be in a cloud. While the charging devices installed in the vehicles regulate the individual charging processes, the central computing unit forms the backend of the application. Here, the information is gathered and evaluated, predictions are made, optimized total charging power profiles are calculated, individual charging profiles are determined and the on-board charging devices are controlled to perform the charging process.

In some embodiments, individual steps of the method can also be carried out in a vehicle storage/computing unit in the member vehicles. Here, the data about past charging processes and/or other vehicle data and/or user data from past charging processes can be (buffer-)stored and transmitted to the central computing unit via a communication interface. By way of example, said vehicle storage/computing unit can also perform at least part of the evaluation of the data and a prediction about the future charging requirement.

In some embodiments, the chronometric control of the charging processes of the individual member vehicles with respective power profiles can be adapted when required. Since the purchase of the amount of energy is made on the basis of predictions about the total energy requirement and the temporal distribution, and these can be incorrect, this may result in corrections to the charging profiles. Furthermore, the group of member vehicles with their multiplicity X of energy stores (each vehicle battery of a member vehicle is an energy store) as a participant in the electricity market can absorb electricity peaks or electricity dips in the electricity grid. In such a case, even cheaper electricity prices can possibly be achieved on the energy market or standard charges can be dropped. Feeding energy from the vehicle batteries back into the electricity grid can be beneficial, especially in the case of micromarkets in the low-voltage range.

The method described herein therefore offer the advantages that electricity peaks or electricity dips in the electricity grid can be skillfully avoided or exploited and financial or ecological benefits can additionally be generated for the group members. Grid stabilization or frequency compensation can be effected in particular in micromarkets at low-voltage level. As mentioned above, predictions about the total energy requirement and the temporal distribution can be beset with errors or uncertainties. The error to be expected in a prediction is in this case generally greater, the further in the future the future time period for which a prediction is made. Amongst other things, the number of "plugged-in" vehicles that are ready to be charged can also change. In the case of a total charging power profile predicted according to the invention, the error will generally lie in fluctuations of the profile above a basic requirement.

In some embodiments, the steps of predicting the total energy requirement, predicting the temporal distribution of the charging power requirement over the future time period, calculating the optimized total charging power profile and purchasing an amount of energy are therefore performed repeatedly at decreasing intervals of time from the future time period, wherein, during the purchasing of the amount of energy, initially only a portion of the optimized total charging power profile is purchased, and, during the repeated performance, some or all of the difference between the optimized total charging power profile and the amount of energy already purchased for the future time period is additionally purchased.

By way of example, only a basic requirement may therefore be purchased on the electricity market during the first performance. A cheaper price can possibly arise at a greater interval from the future time period in this case. The closer the future time period gets, the more accurate the prediction and calculation of the optimized total charging power profile become. However, there is less flexibility for the timing of the charging processes, and the respectively applicable electricity price must be paid. On the basis of the basic requirement already met previously, only the difference of the required amount of electricity now has to be additionally purchased at the respectively applicable price, however. This can preferably be repeated multiple times, the predictions preferably becoming more accurate each time.

Some embodiments include a central control unit for electrically charging vehicle batteries for a group of member vehicles, having:
 a reception device for receiving vehicle data and/or user data of member vehicles belonging to the group,
 a prediction unit for predicting a total energy requirement of the group of member vehicles in a future time period,
 a prediction unit for predicting a temporal distribution of the charging power requirement of the member vehicles over the future time period,
 a computing unit for calculating a total charging power profile, which is optimized in respect of one or more optimization criteria, for the group of member vehicles according to the predicted total energy requirement and the predicted temporal distribution of the charging power requirement,
 and a control unit for chronometrically controlling charging processes of the individual member vehicles from the group with a respective charging profile in such a way that the sum of the respective charging profiles of the individual member vehicles corresponds to the optimized total profile of the charging power.

The central control unit may perform one or more of the methods as described herein.

Some embodiments include a vehicle storage/computing unit designed to store information about past charging processes and/or other vehicle data and/or user data from past charging processes and to transmit said information and/or data to the central control unit via a communication interface. Said vehicle storage/computing unit may be arranged in a vehicle, in particular in a member vehicle.

In some embodiments, the vehicle storage/computing unit is also designed to evaluate the stored data and/or to predict a future energy requirement and preferably the time characteristic thereof. The prediction of the future energy requirement for the member vehicle can then be made in the vehicle itself and transmitted to the central control unit.

As shown in FIG. 1, the group 10 contains X participating member vehicles (1, 2, . . . N, N+1, . . . X), a subset N of which is connected to a charging station 12, i.e. plugged into a charging socket, at a point in time. The subset N can in turn comprise a plurality of regionally limited subgroups (not illustrated).

Figure 2:
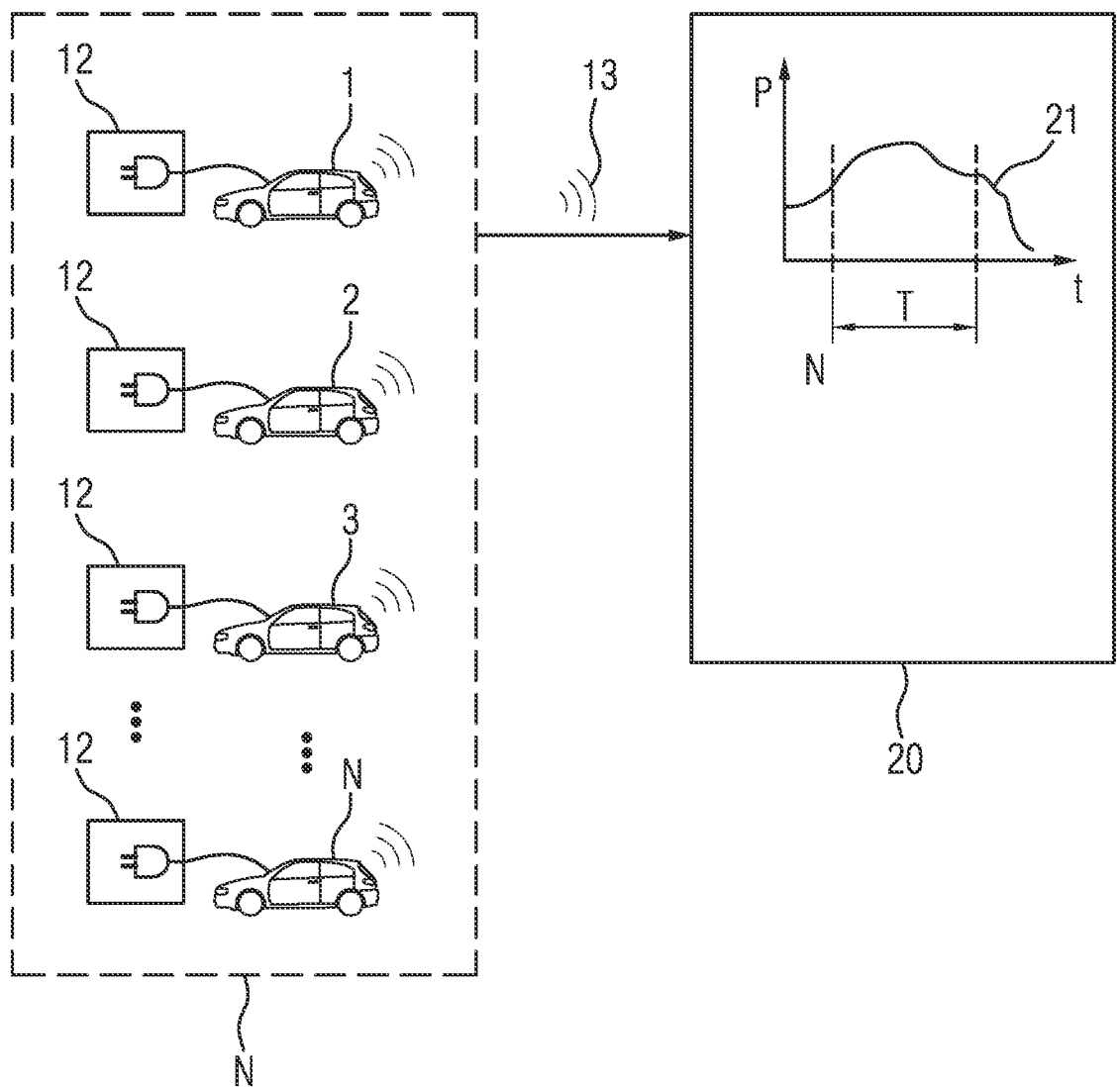
FIG. 2: shows steps of an example method for determining the energy requirement of the group of vehicles and a statistical power distribution over a future time period, the method incorporating teachings of the present disclosure.

FIG. 2 schematically shows how the N member vehicles transmit user and vehicle data to the central computing unit (backend) 20 by way of wireless communication 13. By way of example, the vehicle data include information about the state of charge (SOC) of the vehicle battery, information about past charging processes, user profiles, information obtained, for example, on the basis of past journeys (driving habits, repeated or regular journeys, schedules, personal charging behavior of the user).

Information about past charging processes of the vehicles included in the group is preferably statistically evaluated in the central server unit 20. By way of example, information about past charging processes can be recorded over periods of use of the electrical charging devices 14 on the vehicles (on-board chargers) and transferred to the central computing unit 20.

In some embodiments, information about past charging processes can be obtained on the basis of periods of use of the electrical charging devices installed in the member vehicles. On the basis of the data received, a prediction 21 is made in the central computing unit 20 about the total energy requirement for the N vehicles in the future time period T and the temporal distribution thereof.

Figure 3:
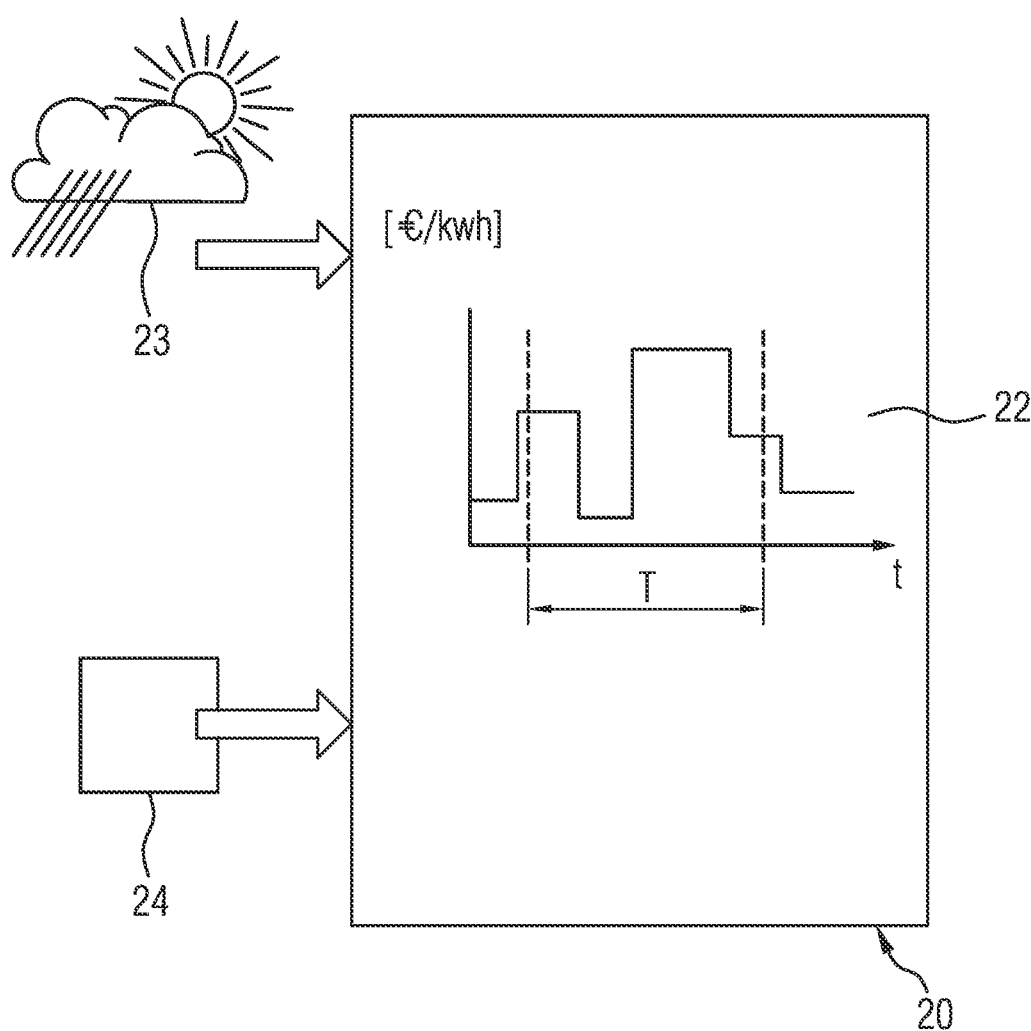
FIG. 3: shows the prediction of a price trend on the energy market based on teachings of the present disclosure.

FIG. 3 shows a prediction 22 being made for the electricity price trend for the future time period T. The computing unit 20 receives price information 24 from the energy market for this purpose. Weather data 23 are additionally taken into consideration and an improved electricity price prediction 22 is made for the time period T.

Figure 4:
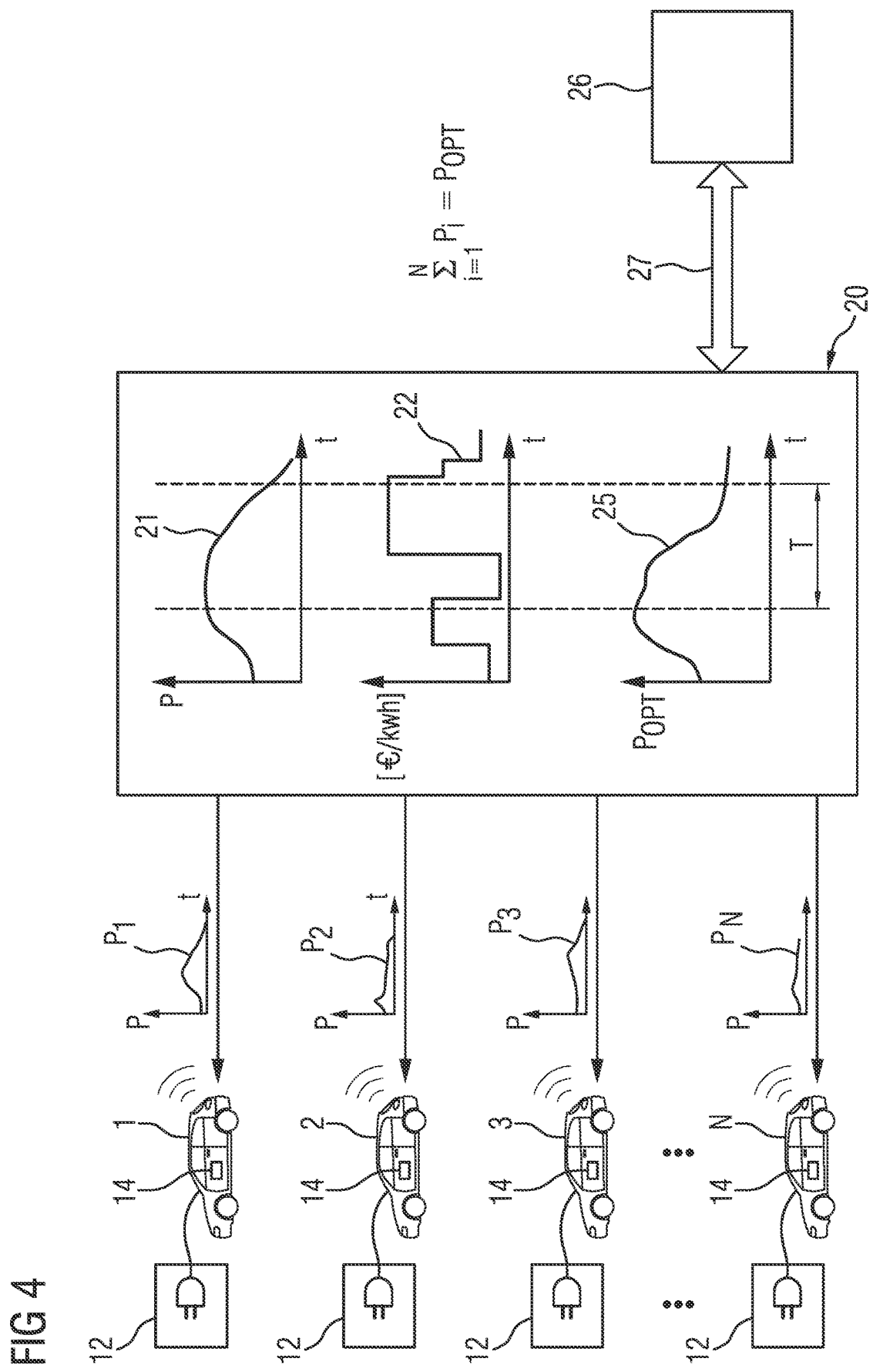
FIG. 4: shows an overview of an example method incorporating teachings of the present disclosure.

FIG. 4 shows a complete overview of an example method incorporating teachings of the present disclosure. N vehicles 1, 2, 3, . . . N from the group N are plugged into the charging socket 12 and transmit user or vehicle data to the central computing unit 20 by way of wireless communication 13. Said computing unit takes the user and vehicle data and also the information about past charging processes already gathered and also weather data 23 as a basis for drawing up a total energy requirement of the N vehicles in the time period T, a temporal distribution of the charging requirement over the time period T and a prediction for the electricity price trend in the time period T. An optimized total charging power profile POPT, 25 is calculated therefrom, which, for example, is optimized for a low electricity price or for a proportion of renewable energy sources. Energy may then be purchased 27 on the electricity exchange 26 in accordance with this optimized total charging power profile 25.

A respective charging power profile Pi is calculated for each of the N member vehicles 1, 2, 3, . . . N, and the respective charging apparatus 14 of the member vehicles is controlled appropriately to perform the charging process. The sum of the individual charging power profiles Pi then corresponds to the optimized total charging power profile POPT.

The teachings herein therefore make it possible to predict a collective energy and charging requirement for a group of vehicles on the basis of user and vehicle data, and weather forecasts. On the basis of this predicted requirement and a predicted electricity price trend, energy can be purchased and used in a manner that is optimized in respect of the price or in respect of the utilization of renewable energy sources. A financial advantage that was able to be attained through entry to the electricity market as a group can therefore be passed on to the users.

What is claimed is:
1. A method for electrically charging vehicle batteries for a group of member vehicles, the method comprising:
 predicting a total energy requirement for electrically charging vehicle batteries for the group of member vehicles in a future time period;

predicting a temporal distribution of the charging power requirement for the group of member vehicles over the future time period;

calculating a total charging power profile optimized in respect of one or more optimization criteria, for the group of member vehicles according to the predicted total energy requirement and the predicted temporal distribution of the charging power requirement;

purchasing an amount of energy in accordance with the optimized total charging power profile on a relevant energy market; and chronometrically controlling the charging processes of each member vehicle from the group with a respective charging profile so the sum of the respective charging profiles of the individual member vehicles corresponds to the optimized total profile of the charging power.

2. The method for electrically charging vehicle batteries for a group of member vehicles as claimed in claim 1, further comprising predicting a price trend expected for electrical power on a relevant energy market in the future time period.

3. The method for electrically charging vehicle batteries for a group of member vehicles as claimed in claim 2, wherein the price trend to be expected for electrical power on a relevant energy market in the future time period depends on weather data.

4. The method for electrically charging vehicle batteries for a group of member vehicles as claimed in claim 1, wherein the optimized total charging power profile for the group of member vehicles depends on weather data and/or a predicted price trend on the relevant energy market.

5. The method for electrically charging vehicle batteries for a group of member vehicles as claimed in claim 1, wherein the total energy requirement for electrical charging and/or the temporal distribution of the charging power requirement for the group of member vehicles over the future time period depends on a statistical evaluation of information about past charging processes of the member vehicles.

6. The method for electrically charging vehicle batteries for a group of member vehicles as claimed in claim 1, wherein the member vehicles transmit information about charging processes and/or other vehicle data and/or user data to a central computing unit via a wireless communication interface.

7. The method for electrically charging vehicle batteries for a group of member vehicles as claimed in claim 1, further comprising evaluating user data of drivers of the group for predicting the total energy requirement and predicting the temporal distribution of the charging power requirement for the group of member vehicles over the future time period.

8. The method for electrically charging vehicle batteries for a group of member vehicles as claimed in claim 1, wherein the chronometric control of the charging processes of the individual member vehicles with respective power profiles is adapted when required.

9. The method for electrically charging vehicle batteries for a group of member vehicles as claimed in claim 1, wherein: predicting the total energy requirement, predicting the temporal distribution of the charging power requirement over the future time period, calculating the optimized total charging power profile, and purchasing an amount of energy are performed repeatedly at decreasing intervals of time from the future time period;

during the purchasing, initially only a portion of the amount of energy in accordance with the optimized total charging power profile is purchased; and during the repeated performance, some or all of the difference between the optimized total charging power profile and the amount of energy already purchased for the future time period is additionally purchased.

* * * * *